United States Patent [19]
Gordon et al.

[11] Patent Number: 5,274,801
[45] Date of Patent: Dec. 28, 1993

[54] ARTIFICAL INTELLIGENCE DELIVERY SYSTEM

[75] Inventors: O. Michael Gordon, Raleigh, N.C.; John R. Hubbell, Chicago, Ill.; Norman J. Woodland, Raleigh, N.C.

[73] Assignee: International Business Machines Corp., Armonk, N.Y.

[21] Appl. No.: 584,404

[22] Filed: Sep. 17, 1990

Related U.S. Application Data

[63] Continuation of Ser. No. 187,755, Apr. 29, 1988, abandoned.

[51] Int. Cl.⁵ .............................................. G06F 15/40
[52] U.S. Cl. ............................ 395/600; 364/DIG. 1; 364/274; 364/274.2; 364/274.3; 364/282.1; 364/282.2; 364/282.3; 395/50
[58] Field of Search ............ 364/513, 200 MS File, 364/900 MS File; 395/600, 700, 50, 54, 75, 60

[56] References Cited

U.S. PATENT DOCUMENTS

| | | | |
|---|---|---|---|
| 4,636,974 | 1/1987 | Griffin | 364/900 |
| 4,675,829 | 6/1987 | Clemenson | 364/513 |
| 4,704,695 | 11/1987 | Kimura et al. | 364/513 |
| 4,763,277 | 8/1988 | Ashford et al. | 364/513 |
| 4,809,219 | 2/1989 | Ashford et al. | 364/400 |
| 4,815,005 | 3/1989 | Oyanagi et al. | 364/513 |
| 4,835,690 | 5/1989 | Gangarosa et al. | 364/413.13 |
| 4,841,441 | 6/1989 | Nixon et al. | 364/401 |
| 4,866,634 | 9/1989 | Reboh et al. | 364/900 |
| 4,866,635 | 9/1986 | Kahn et al. | 364/200 |
| 4,884,218 | 11/1989 | Agnew et al. | 364/513 |
| 5,021,992 | 6/1991 | Kondo | 395/600 |

FOREIGN PATENT DOCUMENTS 0309756 4/1989 European Pat. Off.

OTHER PUBLICATIONS

Patent Abstracts of Japan, vol. 12, No. 276 (P-737) Jul. 30, 1988 & JP-A-63 056 726 (Hitachi) Mar. 11, 1988 & U.S. Pat. No. 5,021,992 (Kondo, H.) Jun. 4, 1991.

*Primary Examiner*—Kevin A. Kriess
*Attorney, Agent, or Firm*—Edward H. Duffield

[57] ABSTRACT

Disclosed is a system that provides an expert system's equivalent consultation without containing either the original knowledge base or the inferencing and logic shell of an expert system. System and process implementations provide a transformation and record of results from an original expert system's knowledge base which has been exercised through a full series of all possible consultations utilizing the expert system's own shell and knowledge base. The resulting transformation of a knowledge base is captured in the form of tabular histories of inquiries, responses and results and made available to a user via a table driver access mechanism. Results identical to those produced on the original expert system are obtained in a system containing neither the knowledge base nor the inferencing and logic mechanisms. The system provides an identical dialog of interaction with a human user and produces the same conclusions as the original expert system but requires only a small fraction of the computational and memory resources needed for running the original expert system.

4 Claims, 10 Drawing Sheets

THE MODIFICATION PROCESS

MODIFIED EXPERT SYSTEM

ARTIFICAL INTELLIGENCE DELIVERY SYSTEM

This is a continuation of Ser. No. 187,755 filed Apr. 29, 1988 now abandoned.

FIELD OF THE INVENTION

This invention relates generally to artificial intelligence expert systems which accept inquiries for information and provide responses thereto. More specifically, the invention relates to a method and apparatus for providing, in a system having neither the knowledge base nor the inferencing and access driving mechanism of an actual expert system, responses equivalent to those provided by a full expert system.

BACKGROUND OF THE INVENTION

Prior Art

In the field of artificial intelligence, expert systems have come to be well known. These are systems that simulate a human expert's abilities. One type of such a system conducts an interactive consultation with a human client to address the client's needs, concerns or problems. The system and its program provide the assistance and advice that would be provided by a human expert in response to the same consultation questions and inquiries. Systems of this type are being increasingly used in many different applications including complex system controls, network management, hardware and software problem determination, computer system configuring, medical diagnosis, mineral exploration and other "knowledge domains" where human expertise is generally required.

These systems normally utilize a controlling program for analyzing a client's inquiries and providing access to the system's knowledge base that contains responsive queries and various answers and data. The controlling program provides access to the knowledge base utilizing inferential capability and logic. The inferencing and logic means is generally contained in a "shell" to which the knowledge base for the user's domain of interest is added.

Expert system shells access the domain's knowledge base to provide responses to a client's inquiry either in the form of a question to be answered by the client in order to elicit enough information to provide an answer, or eventually provide an answer or data that will suit the client's request. The controlling shells are designed to work with the knowledge bases for the various knowledge domains that they are to access and utilize. The development of such shells is a highly time consuming and costly task. As a consequence, generalized shells that operate on more generalized knowledge bases have been developed. These general control system shells have come to be known in association with various areas of expertise. Several commercially available shells exist and can be purchased or licensed for use in a variety of knowledge base domains. Some examples are EMYCIN which was developed by Stanford University and which has been useful with knowledge bases in the field of bacterial disease. Another commercially available shell is M.1 developed and licensed by the Teknowledge Corporation. Yet another expert system shell is known as the Expert System Environment developed by the IBM Corporation as program number 5798-XXX. Expert System Environment is available in a number of versions depending upon the computer operating system on which it is desired to run. A general information manual GH20-9597-1 is available and a reference manual SH20-9609-2 and user's guide SH20-9608-1 exist and can be purchased separately from the IBM Corporation for a greater understanding of its existing shell.

The operation of each of the "shells" is somewhat similar but differs with respect to the particular computer or operating system in which it is intended to run and with respect to the type of knowledge that it can most conveniently process.

An expert system shell operates on a knowledge base. The development of a knowledge base or a given domain of expertise is a tedious, costly and time consuming task. The knowledge base itself is structured according to the operating details of the specific shell with which it is intended for use. Human expertise in the particular domain of knowledge is required to construct a knowledge base. A human "domain expert", whose data may be augmented by human textual material that may be managed or made available by human beings or by computer retrieval systems or the like, is employed to help create the knowledge base. The domain expert, of course, needs to have the details and/or instructions of how to build the specific knowledge base for the particular "shell" that is to be used. The shell vendors provide the instructions and also provide sample knowledge bases to facilitate construction of specific knowledge bases by domain experts who intend to use the vendor's shells.

For example, MYCIN is the commercial name of an expert system that provides consultations on bacterial disease. MYCIN was developed at Stanford University and is described in the book entitled, "Rule Based Expert Systems" by Buchanan and Shortliffe.

A problem exists in this field of which is due to the complexity of expert systems and the amount of storage required. An expert system itself is the combination of the inferencing and access logic means, generally referred to as the "shell", and the knowledge base with which the shell is to be used. Such systems require substantial amounts of active computer memory for processing and generally require a high speed logic system for their execution and/or development. This is true partially because each shell contains an inferencing mechanism that requires substantial portions of active memory for storage, analysis and formulation of further logical alternatives and inquiry paths in response to specific user inquiries. The large storage requirements are also due to the massive contents of any specific knowledge base.

This problem becomes acute and raises substantially the cost of using replicated expert systems, a type of usage that is often desired since access to the available expertise of the system is often needed at a variety of locations. Thus, expert systems are usually not available at all without access to large computer system resources. Potential users of the expertise within a given knowledge domain managed by an expert system of this type often have dispersed computer or data processing operations and do not have at each location the amount of computer system resource that is required. Each individual location at which access to consultational execution of centrally developed expert systems might either be necessary or desired may not, therefore, be able to obtain such services. Even the users that do have access to such major system resources may desire to conduct their consultation at some other more remote location where the computer resource is not available. Additionally, some computer environments differ from those on which the expert system may have originally been developed and thus the expert system cannot be used at all.

It might be useful, therefore, to attempt to provide an expert system that is available for clients without regard to the type of computer system on which the expert system will be operated. This would require that the users have a computer system that can run the "shell" used for implementing and developing the expert system. This system need not necessarily be the specific computer system for which the shell that they intend to use was developed. However, such "universal" expert systems are not available due to the aforementioned problem of a great investment in system size and resource that is necessary.

It is also apparent that a great deal of expense and time will be utilized in developing specific knowledge bases and shells. The resulting cost of delivering a full expert system to a human client is therefore prohibitively large in many instances. It would be desirable if the full benefit of expert system consultation could be made available to end users without exposing either the knowledge base or the expensive inferencing mechanism and logic system in the "shell" portion. It is the shell that combines the known pieces of information, decides what other information to seek and which uses all of those resources available to produce a valid consultation result in the original expert system. Thus, the inferencing methodology of a KB/shell combination is a highly valuable piece of system control programming of which exposure should desirably be limited or prevented, if possible.

In the foregoing cases, it would be most desirable if a "delivery vehicle" that does not expose the interactions of the knowledge base and the shell mechanism of the original expert system could be provided. Such a "delivery vehicle" would be any means or technique that permits dissemination of or delivery of or access to the available expertise in the expert system without exposing either the expert system shell or all of the specific knowledge base. For example, it would be most desirable to provide the capability of running consultations against the expertise of an expert system on small personal computers without exposing either the original knowledge base or the inferencing shell mechanism to duplication and/or discovery by the users.

OBJECTS OF THE INVENTION

In light of the foregoing known difficulties with the development of expert system delivery mechanisms and inquiry systems, it is an object of this invention to provide an improved means of supplying expert system consultation services without exposing the knowledge bases or the inferencing shell mechanisms to the user.

Yet another object of the invention is to provide an improved expert system equivalent that can be run in small computer systems but which does not contain either the original knowledge base or the inferencing or logic (known as the shell) that provides access to and interpretation of the contents in the knowledge base.

BRIEF SUMMARY

The present invention addresses the above requirements and constraints by providing a transformation and capture of the knowledge base. This may be captured in the form of tables or otherwise. The transformation process is applied to the original expert system's full series of all possible consultations utilizing the expert system's knowledge base. The resulting transformation and capturing of the consultations in the form of tabular histories is made available to a user by providing a table driver or access means. The tables of the transformed expert system consultations and knowledge base may be provided in a diskette or other similarly portable media for operation in a small computer system. The table driver constitutes an access means or program that can access the tables of information that have been transformed from their original expert system. As such, the small computer, together with the transformed and captured results of the full expert system, constitutes an "equivalent" expert system.

The invention provides the equivalent to the full expert system responses for consultations. Results identical to those produced by the original expert system are obtained in a system that does not contain either the knowledge base or the inferencing and logic mechanisms. The equivalent expert system provides an identical dialog of interaction with the human user and produces the same conclusions as the original expert system. In our invention, all logically possible consultations have been previously executed and captured in the form of tables during the transformation process conducted on the original expert system. In our invention, the transformation is accomplished utilizing transformation programs that interact with the knowledge base and with temporary data files constructed for intermediate storage. The tables or files which result may then be delivered as the transformed knowledge to be used in a user's system where they may be accessed by a table driver program. In this way, only a small fraction of the computational and active memory resources needed for running the original expert system are required for a user to perform an equivalent consultation on a much smaller system.

BRIEF DESCRIPTION OF THE DRAWINGS

The invention is further described with reference to several figures depicting aspects of a preferred embodiment thereof in which:

FIG. 10 illustrates an example of a path's table resulting from the transformation process and used by a table driver program.

DETAILED SPECIFICATION

Figure 1A:
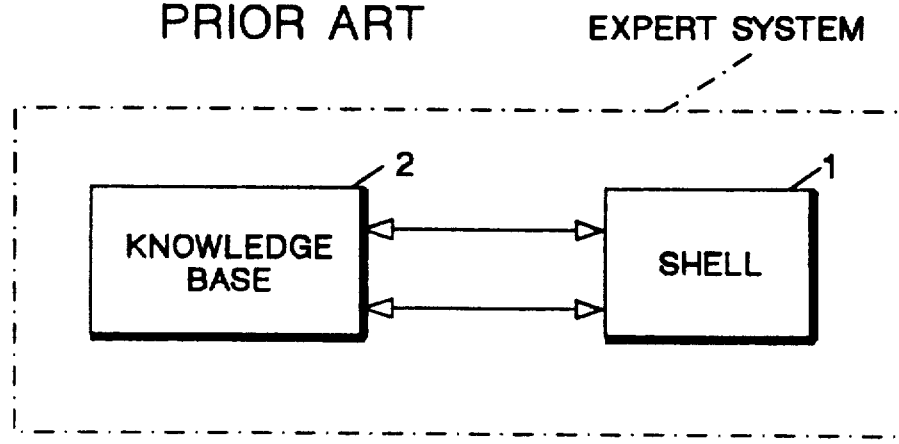
FIG. 1A illustrates the generally known configuration in the prior art of an expert system.

As outlined briefly in the summary above, our invention includes novel methods and mechanisms for modifying an existing expert system's knowledge base and for transforming the modified knowledge base by exercising the system through all logically possible sequences of inquiry and response and capturing the resulting responses. This results in a sequential history of inquiry and response patterns or findings that do not themselves contain either the knowledge base or the original expert system's inferencing and logic shell means. The resulting captured output of responses can be accessed by a table driver access means or program. The access program can find an individual inquiry and its associated response or responses that would have been generated by the original expert system utilizing its inferencing and logic shell means and its original knowledge base. From the user's viewpoint, the "system" that is accessed is an "equivalent expert system" since it provides equivalent results, but it does not contain either the original knowledge base or the original expert system's shell. These highly expensive knowledge base and shell components of an expert system are thus not exposed to duplication or discovery of their unique contents. However, the effective result of using these expensive components in any given consultation can be achieved for the user without exposing either of these costly elements.

Our invention includes novel means and methods for achieving the transformation of the original expert system's knowledge base. These are included in subsections below generally describing the preparatory modification process and then the actual transformation process. Together, the modification and transformation process use the implicit logic tree contained in the pattern of legitimate logic decision points made during real consultations on their original expert system to create results in a form that contains the real logic tree. The real logic tree is embodied as the logical and sequential record of all legitimate inquiries and responses as found in the original expert system. Our process captures the real logic tree and renders it in a usable form without exposing either the original knowledge base or the original expert system's shell. Our transformation method and apparatus effectively drive an original expert system sequentially through all possible logically valid consultations and capture the expert system's data requests, valid responses and the sequences of these requests and responses as they lead to a final consultation which itself is captured as well. The overall result may be called a "transformed expert system" which is captured in a storage medium such as a diskette and used with a table driver access program to provide a "virtual expert system" delivery vehicle for a given user. The user employs a table driver or access means to gain access to the tables of results utilizing a small computer as his "equivalent" or "virtual" expert system delivery method and apparatus.

A table driver program is used to access the captured tables of the transformed expert system and to properly interpret and deliver the results of the data found therein. Such a table driver presents the expert system's data requests to the client in the sequence that would normally occur if a client were using the actual original expert system. The client's responses are used by the table driver program to properly access the next indicated result or action and to make an information presentation to the user. The information presented may be a conclusion, intermediate advice, or a request for more data. The consultation continues and finally completes on an equivalent expert system just as it would have on the original expert system: It provides a recommended answer or solution for the client in response to his inquiry.

Of particular value of our invention is the ability to generate table driver programs for delivering in any target computer system, the captured result tables from the transformed knowledge base. This constitutes for the user an equivalent expert system that may be consulted utilizing his own small computer.

Our transformation process includes a step of driving the original expert system through all logically possible consultations without the need for human interaction. Our process first modifies the knowledge base. It alters the contents and controls of the original knowledge base during the modification step so that the knowledge base can interact with automatically executed computer program inputs rather than with a human being. In our system, after the modification of the knowledge base has been completed, a transformation process is carried out to generate and capture the necessary history of a completely exhaustive consultation. In our preferred embodiment of the invention, the information is captured in the form of tables. The process that we utilize controls an exhaustive execution of all of the logically possible consultations of the modified knowledge base of the original expert system, including deciding how to proceed and recognizing when the process has exhausted all of the consultations that are possible.

The modification process used on the knowledge base of the original expert system will now be described.

Modification of Knowledge Base

A typical rule-based prior art expert system, such as that shown in FIG. 1A interacts with a human client within a particular domain of knowledge. During the transformation process in our invention, it is desired to exhaustively execute all logically possible consultations of the original expert system within its knowledge domain without the need for a human being to interact with it. A preliminary change, prior to the actual transformation of the knowledge base is necessary to allow removal of the human interaction. In our invention, this preliminary change is achieved by a process which we have called a modification process. The preliminary change is necessary to automate the execution of all possible consultations during the transformation process.

The modification process changes the embedded controls of the expert system knowledge base so that they no longer require interaction, i.e., responses from a human being. Instead, the modified knowledge base enables interaction to occur with automatically accessed computer files.

The changed or modified knowledge base, in combination with the appropriate original expert system inferencing and logic "shell" is referred to herein as a modified expert system. The modified expert system is shown schematically in FIG. 2B. In order for the modified expert system to operate in the same fashion as the original expert system, it is required that the knowledge content and the way in which that knowledge is processed be unchanged in any way from the original. This may be accomplished without exposing either the original knowledge base or the original inferencing shell as will be shown in the following example.

As an example of modifications done using part of a knowledge base in a domain of knowledge that can be consulted using IBM's previously noted shell, we will consider the following. It will be understood, for example, that the process is identical in many rule-based expert system utilizing its related knowledge bases and shell.

Some definitions are in order at this point. For example, a knowledge base is composed of a "domain of knowledge" of facts and reasoning documented in the form of "parameters" and "rules". These constitute instructions on how to process the knowledge and instructions that specify with whom or where an expert system is to interact to obtain its inputs and to provide its outputs. For the purposes of this discussion, "parameters" are defined as variables of the knowledge domain to which values need to be assigned. During a consultation by a human client, a parameter and its corresponding assigned value are together referred to as a "fact". "Rules" are a relation between "facts". Rules and parameters together are referred to as "entities" in this description.

The instructions for processing the knowledge in the knowledge base and for controlling the system's interaction with a user and for indicating where to obtain inputs and to provide outputs are all contained within the "entities" of the knowledge base. The entities determine how the expert system is to request needed information and/or to provide advice and other information to the client. For example, requested information might be provided by a client through a terminal keyboard and correspondingly, advice or answers might be provided to the client through a terminal display.

Figure 2A:
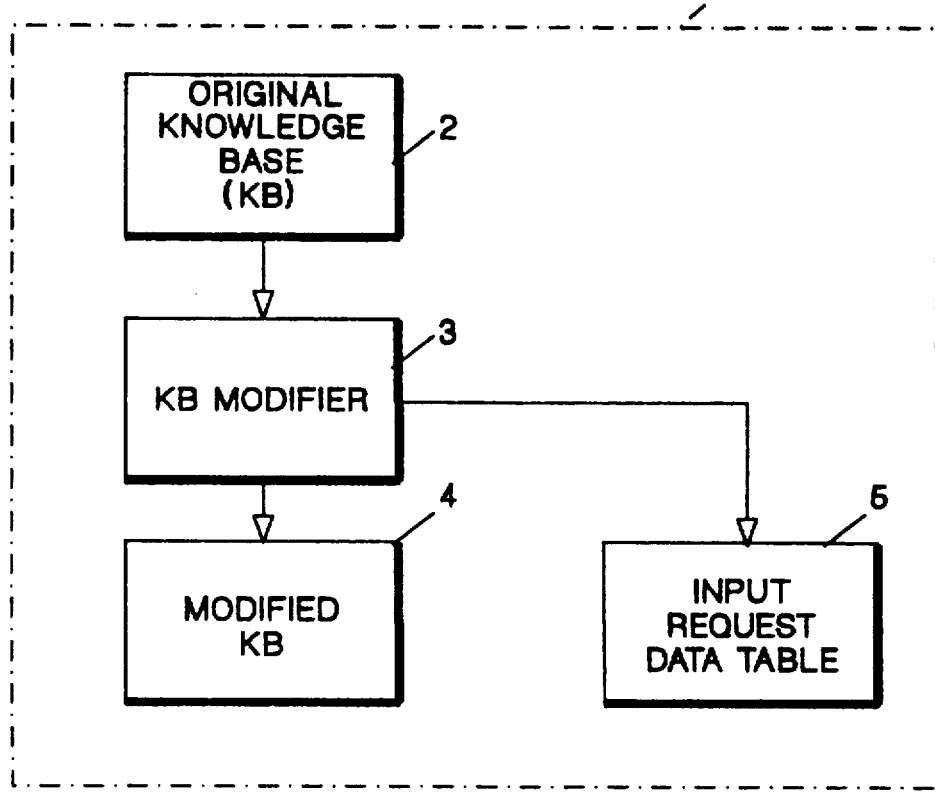
FIG. 2A illustrates schematically the knowledge base modification process and apparatus.
Figure 2B:
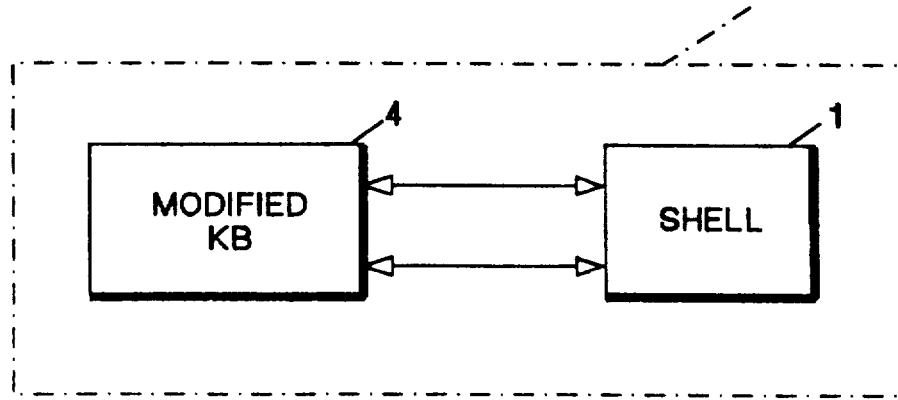
FIG. 2B illustrates schematically a modified expert system resulting from the use of a modified knowledge base by the existing expert system shell.

A knowledge base modifier 3, as shown in FIG. 2A, conducts the modification process. It generates a modified knowledge base 4 and a series of captured input request sequences in the form of an Input Request Data Table 5 by operating upon the original knowledge base 2. The required actions of the modification process are as follows: first, it is necessary to change the knowledge base at all points where sources of requested information are recorded so that no human input is required by the system during the subsequent transformation process. Second, it is necessary to change to a single output all of the indicated receivers of output, advice or other information as contained in the instructions in the knowledge base 2 and to thereby bypass the need for human interaction. An intermediate data file must also be built to facilitate execution of the transformation process. Several of these intermediate files are built during the modification process and include an Input Data run time file and an Input Request Data Table 5, the latter of which is shown in FIG. 2A. The run time file is included generally as any one of several files contained within box 6 in FIG. 3. These several functions and file constructions will now be described in greater detail.

Change All KB-Designated External Sources of Requested Information

During a consultation of the original expert system, the system will attempt to assign values to parameters to be used in combination for reaching a conclusion. How the parameters are assigned values depends upon the source of requested information for each parameter as specified by the knowledge base. The source for the parameter is defined in the knowledge base 2 in FIGS. 1A or 2A. Types of sources might be a human client, a computer program communicating with the expert system, a default value defined in the knowledge base itself and/or assigned by the expert system. Alternatively, the expert system itself may determine a value by access to and utilization of rules that can be processed or which may be inferred from the logical processes involved. Any parameter whose value is to be assigned by the expert system's operation itself is considered to have an "internal" source. A parameter whose value is not to be assigned by the expert system is considered to have an "external" source. Our modification process changes the knowledge base entries that specify sources so that all external sources are changed to be the same defined source, namely a program of a given name. The named program will be invoked during our transformation process. Parameters with internal sources are not changed in any way in our preferred embodiment.

As an example, consider the following. A parameter entity entry in a knowledge base before modification might look like this:

| Name | Direction |
|---|---|
| Prompt | In what general direction are you heading? |
| Legal Values | North, South, East, West |
| Source | Client will input from terminal. |

As can be seen from the above example, this parameter "source" will have a value that will be provided by a human client. The "name" of the parameter (Direction) is listed above, followed by the question (herein called the "prompt") that is to be displayed to the client when a value for this parameter is being requested by the expert system. The possible answers, called "legal values" that the client can give in response to this question are also as shown to be specified by this knowledge base. In our invention there must, of course be a predefined set of legal values for any parameter that has an external source.

When the parameter entity modification process has been conducted, the parameter entity entry in the modified knowledge base 4 in FIG. 2A will look as follows:

| Name | Direction |
|---|---|
| Prompt | In what general directions are you heading? |
| Legal Values | North, South, East, West |
| Source | External data program |
| Program Name | EX IN |
| Program ARGS | Direction |

It will be noted that three changes were made to this parameter entity. First, the source of the parameter was changed from "client" to "external data program". This informs the expert system that it will be necessary to execute a program when it needs a value for this parameter. Secondly, the name of the program to be executed by the expert system when a value for the parameter is required is also identified. In our example above, a single procedure EX IN for all parameter entries that have external sources is used. Thirdly, the name of the parameter to be passed as an argument to the program which defines the parameter values is also identified, in this case. These are all of the changes required in the given parameter entity for designating the chosen single external source for parameter values.

Change All Receivers of Advice and Other Information

During consultations of the original expert system, the system might communicate with a client or another output destination generally called a "sink" by providing advice or some other information such as the status of the consultation, a request for information or the like. This information must be captured during the transformation process that will be described later. Therefore, the original knowledge base 2 requires still additional modifications during the modification process. Just as all requested information was redefined to be provided from a single external source, i.e., a named program, all information provided as output by the expert system is sent to a single destination or sink. Typically, a knowledge base entry in which information about an output is provided will be in a rule entity. As an example, a rule entity before modification is shown below:

---

If Direction = -North- and Season = -Fall-
Then SHOW -You should be able to see the Big Dipper in the sky
45° above the horizon-

---

The portion of this example rule following the word "if" and preceding the word "then" is called the premise of the rule. "Direction" and "Season" are the parameters that the expert system may attempt to resolve in some way specified by the source that would be associated with parameter entity entry in the knowledge base. If during a consultation, a rule's premises become true, then the expert system will perform the indicated action specified by the rule. The action of the rule follows the word "then". In this example, the action is a command word called "SHOW". SHOW signals that the expert system must display to the client the information which follows the command word. The transformation process that will be described later uses a single sink or destination for all expert system output information. Therefore, rules of the form as shown above must be modified.

The following example shows the same rule entity as that shown above after the modification process has been performed:

---

If Direction = -North- and Season = -Fall-
Then PROCESS -You should be able to see the Big Dipper in the sky
45° above the horizon-
USING EX-OUT

---

There were two changes made to this rule entity. First, the command word "SHOW" was replaced by the command word "PROCESS". PROCESS informs the expert system shell that it must execute a program whenever the action specified by this rule is invoked. The information following the command word "process" is passed to the program as an argument. The name of the program to be used, in this case EX OUT, is identified and added to the rule action specification as shown. The output program is the same for all rule entities in a modified knowledge base according to our invention whenever they are to provide information during consultation from an action part of a rule. For other functions, other programs may be specified. These are the only changes required for rule entities.

The next step in the modification process is to build an Input Data run time file to be used later in the transformation process. The transformation process in our environment requires several files for its execution. One of the necessary files contains data extracted from the original knowledge base. Although extracting the data does not require modifying the knowledge base, it is functionally associated with other aspects of the modification process and is therefore included herein with the description of the modification process itself.

The data to be extracted is located only in those parameter entities that have external sources. This is because the parameter entities having external sources are the only ones for which the programs that control the transformation process will supply values. The values are supplied when requested by the expert system during a consultation exercise.

Below is an unmodified parameter entity example as used earlier:

| Name | Direction |
|---|---|
| Prompt | In what general direction are you heading? |
| Legal Values | North, South, East, West |
| Source | Client will input from terminal. |

In this example as repeated above, the data to be extracted and placed in the Input Data run time file is the name of the parameter and the legal values associated with it. The Input Data run time file needs the name of the parameter to distinguish this parameter from other externally sourced parameters. The run time file also needs the legal values in order to pass appropriate responses back to the expert system when information is requested. This is the only data that is extracted from the knowledge base for use in the transformation process that will be described later.

Build Input Request Data Table for an Equivalent Expert System

Figure 1B:
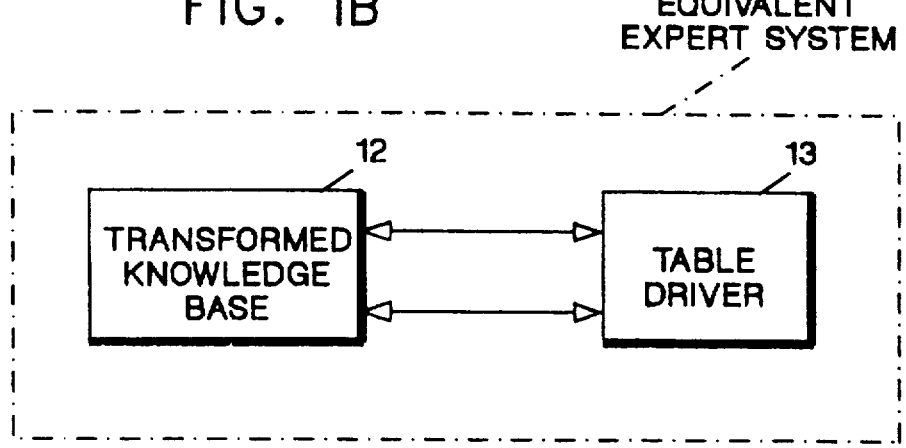
FIG. 1B illustrates in schematic form the equivalent expert system of a preferred embodiment of the invention.

The equivalent expert system in our embodiment such as shown in FIG. 1B requires certain data tables for its operation. One of the necessary tables contains the data extracted from the knowledge base. Although extracting the data does not require changing the knowledge base, this is functionally associated with other aspects of the modification process and is therefore performed during this process of modification. The Input Request Data Table is not utilized during the transformation process, but is used in the equivalent expert system as will appear later.

The data that will be extracted is located only in the parameter entities within the knowledge base that happen to have external sources. This is because the parameter entities that do have external sources are the only ones for which an equivalent expert system would request information from the client.

Below is the same unmodified parameter entity example as given before:

| Name | Direction |
|---|---|
| Prompt | In what general direction are you heading? |
| Legal Values | North, South, East, West |
| Source | Client will input from terminal |

The data to be extracted is the name of the parameter, the prompt and the legal values. The name is needed to distinguish this parameter from other parameters in the equivalent expert system that will be constructed. The prompt is used by the equivalent expert system for displaying a request to the client when a value for this parameter is needed. The legal values are used for displaying to the human client on the equivalent expert system what the possible legal answers are in response to the prompt. This is the only data that is extracted directly from the knowledge base for use by the equivalent expert system. This data is not necessary for the transformation process that will be described later.

In summary, the modification process modifies the existing knowledge base 2 in FIG. 2A so that a later ensuing transformation process can get answers or inputs normally provided by a human client without the need for interaction with a human during execution of this process. Similarly, the outputs provided to a human are redirected during the transformation process to be provided to a single sink. There, they are recorded so they may be used on an equivalent expert system. The modification process itself is used to define where the transformation process can save these outputs. Two other files, namely the Input Data run time file and the Input Request Data Table were generated during the modification process as we have described it for later use. The data to create these files is available from the knowledge base 2 during the modification process.

The Run Time Files

As mentioned earlier, data must be passed to the various parts of a transformation program and between processes or programs. In our embodiment, we have used files for holding this data so that the data providing entity has a repository and the data requesting entity has a source. The files used are called run time files. They are created during both the modification process and the transformation process and are named as follows for purposes of this embodiment:

THE INPUT DATA file: This file is created during the modification process. It contains, for each externally sourced parameter as utilized by the knowledge base 2 in the original expert system, the parameter name, an associated ID number, and a numbered list of the legal responses thereto. It is used during a transformation process to do the following:

First, it is used to provide the parameter number code and response number code as a pair of codes for the CURRENT PATH BEING BUILT file entry that will be described later. Secondly, it is used to provide the legal response for the CONSULTATION INPUT ENTRY file to be discussed later. Finally, it is used to provide the next response number code to the CURRENT LEGAL VALUE entry file when processing of the current entry is completed.

The INPUT DATA file is not changed during our transformation process and is discarded when the process has been completed.

THE CONSULTATION INPUT file: This file is created and used during the transformation process. It contains the entries that are to be passed to the modified expert system for every externally sourced parameter as used in the original expert system. It is cleared after each use.

THE CONSULTATION OUTPUT file: This file is created and used during the transformation process also. It contains the entries that are to be passed from the modified expert system (see FIG. 3) for each interaction with the transformation programs. Examples are: the parameter name of the parameter to be evaluated for a legal value response; or a result to be provided. This CONSULTATION OUTPUT file is accessed to determine if a result is being provided or if a data request is being made. When a result is provided, it is added to the data saved in the OUTPUT DATA TABLE. The consultation output file is cleared after each use. The output data table is saved, however.

THE CURRENT LEGAL VALUE file: This file is created and used during the transformation process as well. It contains, for each externally sourced parameter of the original expert system, the number code of a response to be extracted from an Input Data File for the Consultation Input entry. This is done whenever a parameter's value is requested by the modified expert system. This file is initialized to the first legal value for each such parameter and is updated during the transformation process. The file is no longer of use and is discarded when the transformation process has completed.

THE CURRENT PATH BEING BUILT file: This file is created and used during the transformation process also. Its contents are built up during the execution of a consultation from the coded parameter/response number pairs that are generated and it includes any result codes. When the path of inquiry has been completed, it's sequential history is written into the Paths Table and the Current Path Being Built file is cleared.

In our invention, once the modification process is completed, it is necessary to perform the transformation process which will now be described.

The Transformation Process

The function of the transformation process is as follows. First, the transformation process must exhaustively run every logically possible consultation that the original expert system is designed to handle and to record or capture the sequence of all of these consultations together with the resulting outputs, if any. This portion of the transformation process generates the Paths Table and the Output Data Table.

Figure 3:
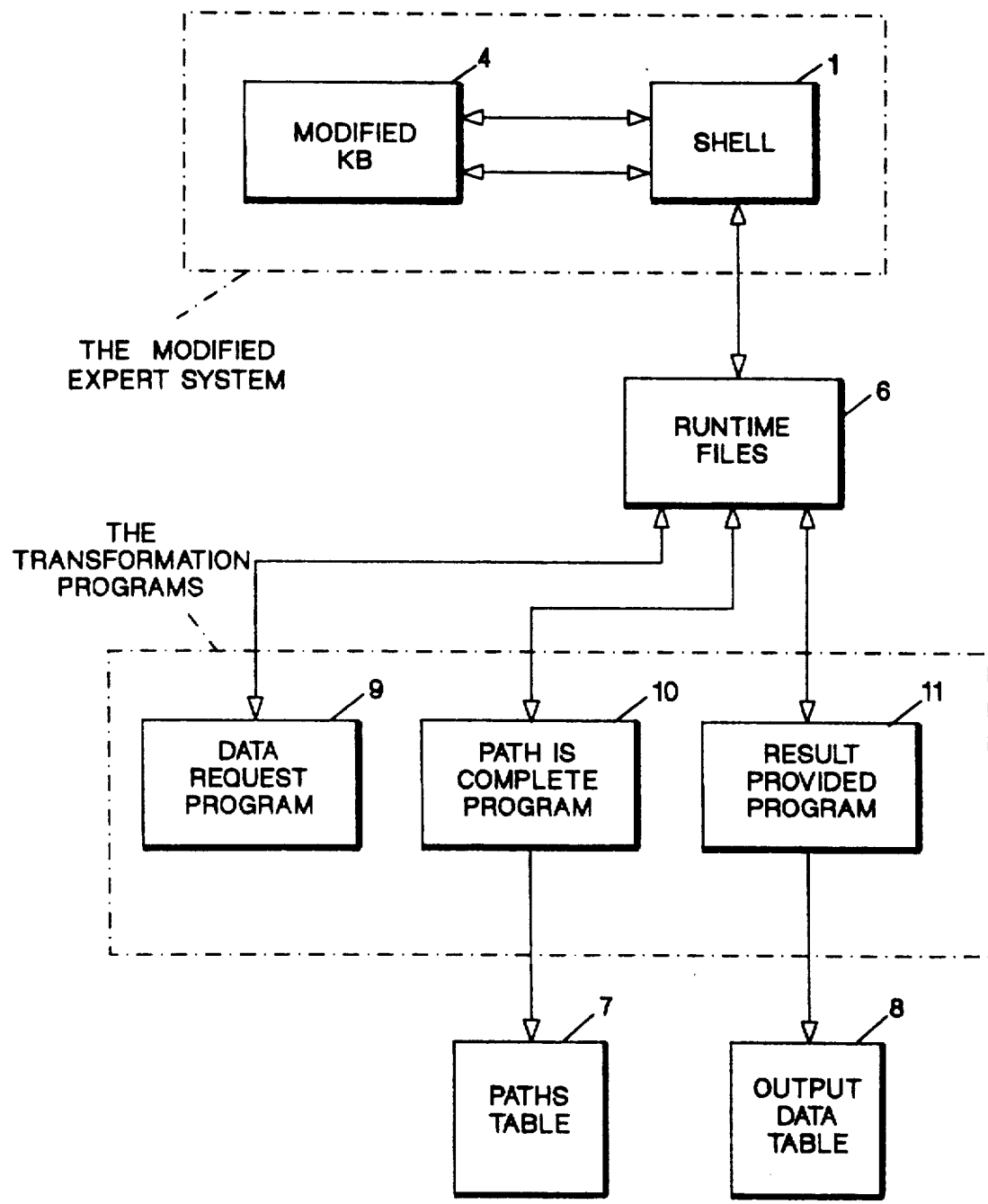
FIG. 3 illustrates schematically the arrangement for providing a transformation process utilizing transformation programs to convert and to capture all logically possible consultations and their results utilizing the modified expert system.

During the transformation process, no human user is involved as a source or sink. The transformation process uses a series of programs for exercising the knowledge base. The knowledge base used is in its modified form which resulted from the modification process described earlier. The transformation programs also exercise the Input Data Run Time File to gather input requests for performing functions using the expert system shell. This is shown schematically in FIG. 3. The use of the modified knowledge base, together with the original expert system shell constitutes a new system that may be described as the "modified expert system" since the modified knowledge base 4 is used with the original expert system shell 1 as shown in FIG. 3. The Input Data Run Time File contains the original expert system's externally sourced parameters and legal values and represents the input requests and legitimate responses thereto. It is this information that the expert system would have required from a human user but which is now provided from the Input Data Run Time File. In the original expert system, the user would have been asked a question, i.e., the "prompt" from the parameter that was being evaluated would have been displayed and the user would have been offered a selection of several responses from among which to choose. These would be the "legal values" of the parameter response. The programs in the transformation process arrange evaluation of each parameter or question so that every possible response is followed wherever it leads to other questions and/or finally to a resolution. This will be seen in greater detail later.

Figure 4:
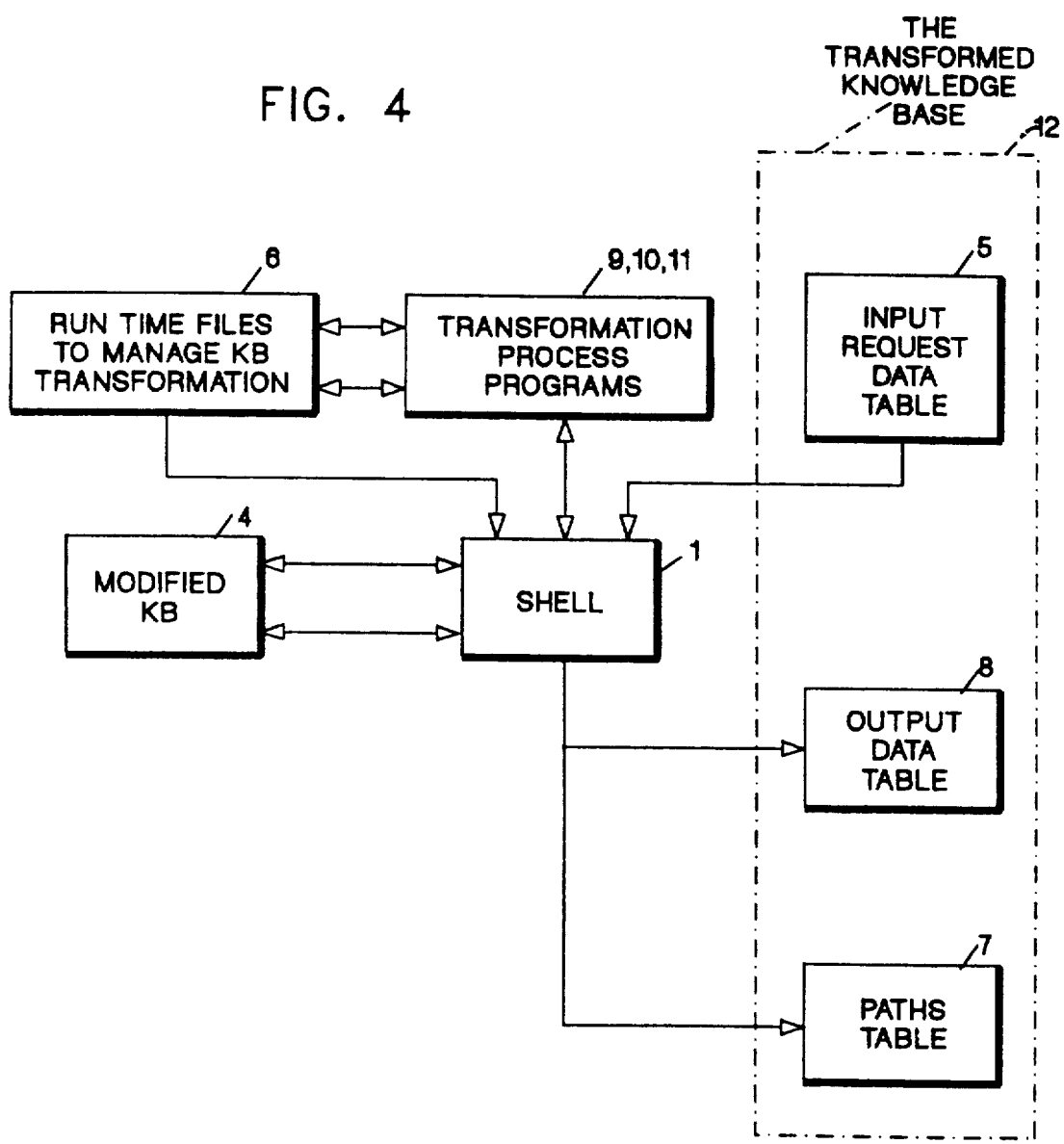
FIG. 4 schematically illustrates the interaction during the transformation process that results in creating the transformed knowledge base for use in the present invention.

FIG. 4 illustrates conceptually the content of the transformed knowledge base 12 which is employed as shown in FIG. 1B together with a table driver. Together, the transformed knowledge base and table driver program constitute an "equivalent expert system" for the user's own consultation. It will be observed in FIG. 4 that the run time files for managing the knowledge base transformation process are the files in box 6 that were indicated in FIG. 3. The transformation process programs are those from boxes 9, 10 and 11 in FIG. 3. The modified knowledge base 4 that resulted from FIG. 2A is used together with the original shell i. The operation of the transformation process programs 9, 10, 11 utilizing the original shell and the modified knowledge base and the run time files result in the creation of the transformed knowledge base 12. An exception is that the Input Request Data Table 5 was created during the modification process in FIG. 2A.

In FIG. 4, during the transformation process, a consultation progresses and coded entries are made to the Paths Table 7 to preserve the sequence in which questions are asked, answers selected and which question was asked next, etc., until a final resolution is presented. The information in the Input Request Data Table 5 was produced as an output from the modification process described earlier. It contains the prompts that are needed by the equivalent expert system as shown in FIG. 1B for presentation to the human user when the equivalent expert system is employed. The prompts are not in the Input Data Run Time File because the transformation process uses the parameter name itself as an identifier. The consultation outputs or results are recorded in the Output Data Table 8 as one of the outputs of the transformation process.

The Paths Table 7 continue a specialized representation for an evaluated parameter. A parameter is given a number code m, and a legal value code n, and is represented in the Paths Table by the pair, m.n. In this representation, m represents the code for the question, that is, the specific parameter, and n represents the code for the current response associated with that question, i.e., the current legal value. The Path Table representation of a result or output is *r, where r is a sequential numerical identifier associated with each output as recorded in the Output Data Table 8.

Figure 5:
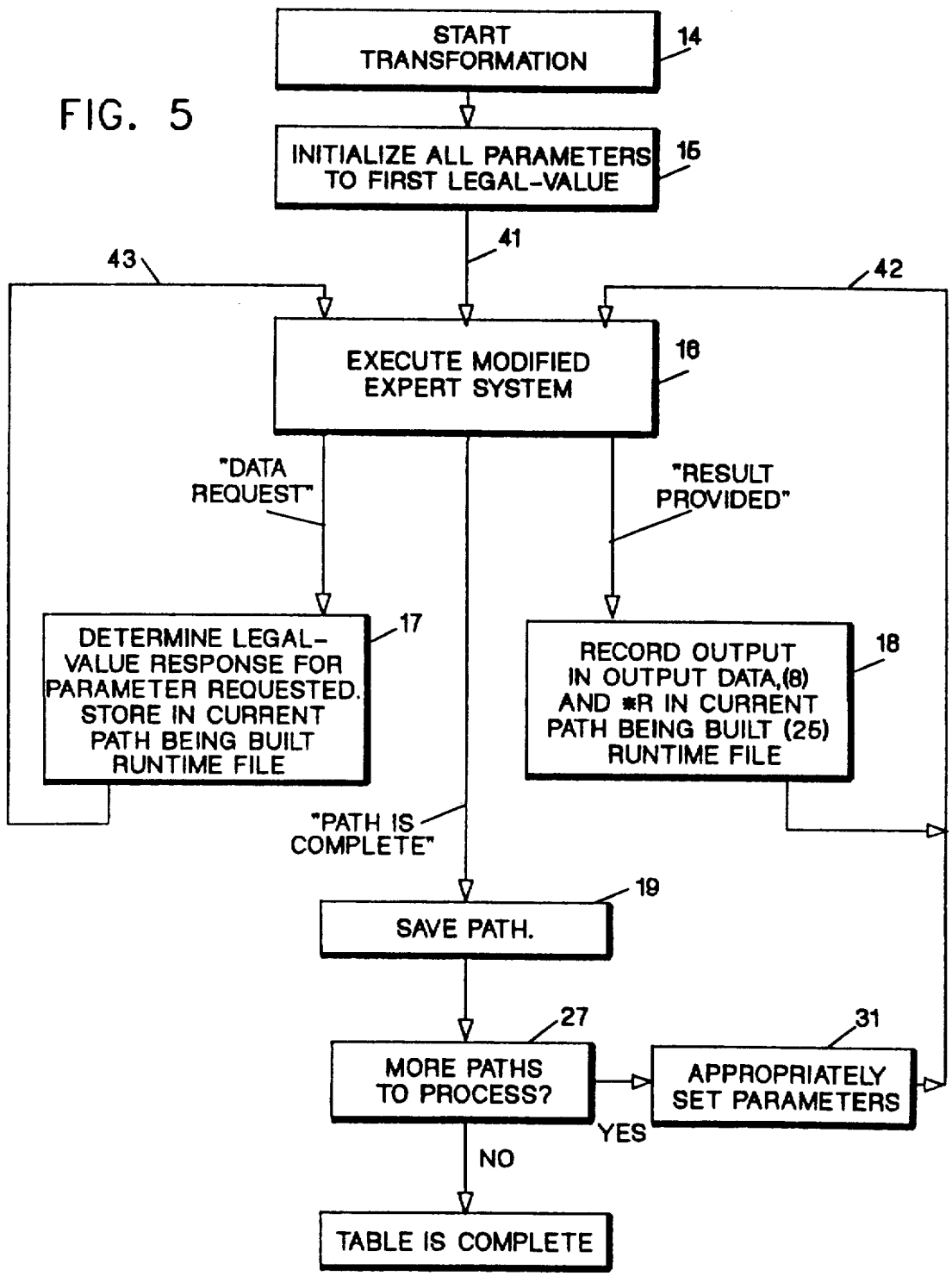
FIG. 5 illustrates in a schematic fashion the program or processing steps utilized in performing the transformation process.
Figure 6:
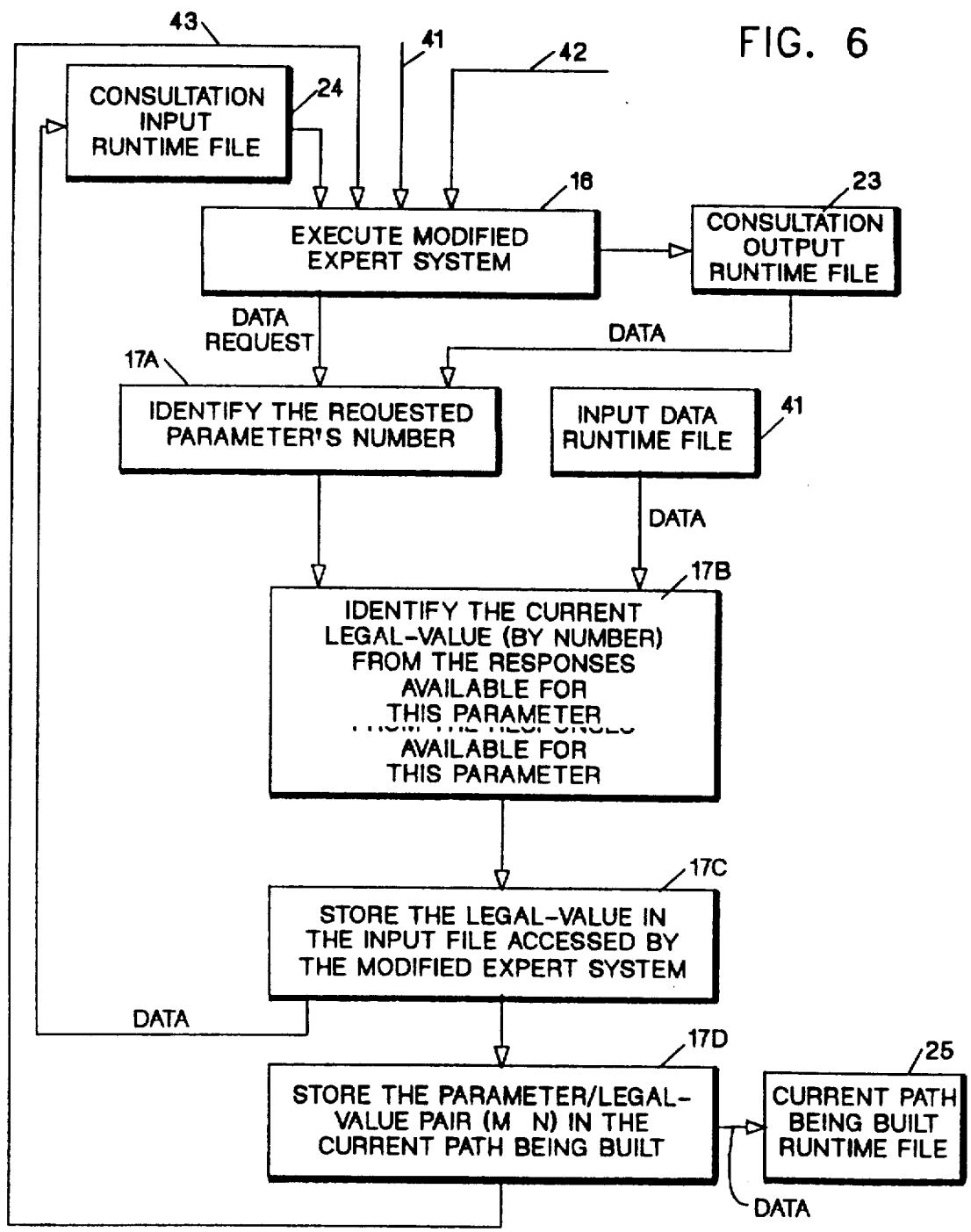
FIG. 6 schematically illustrates details of a portion of the transformation process from FIG. 5.
Figure 7:
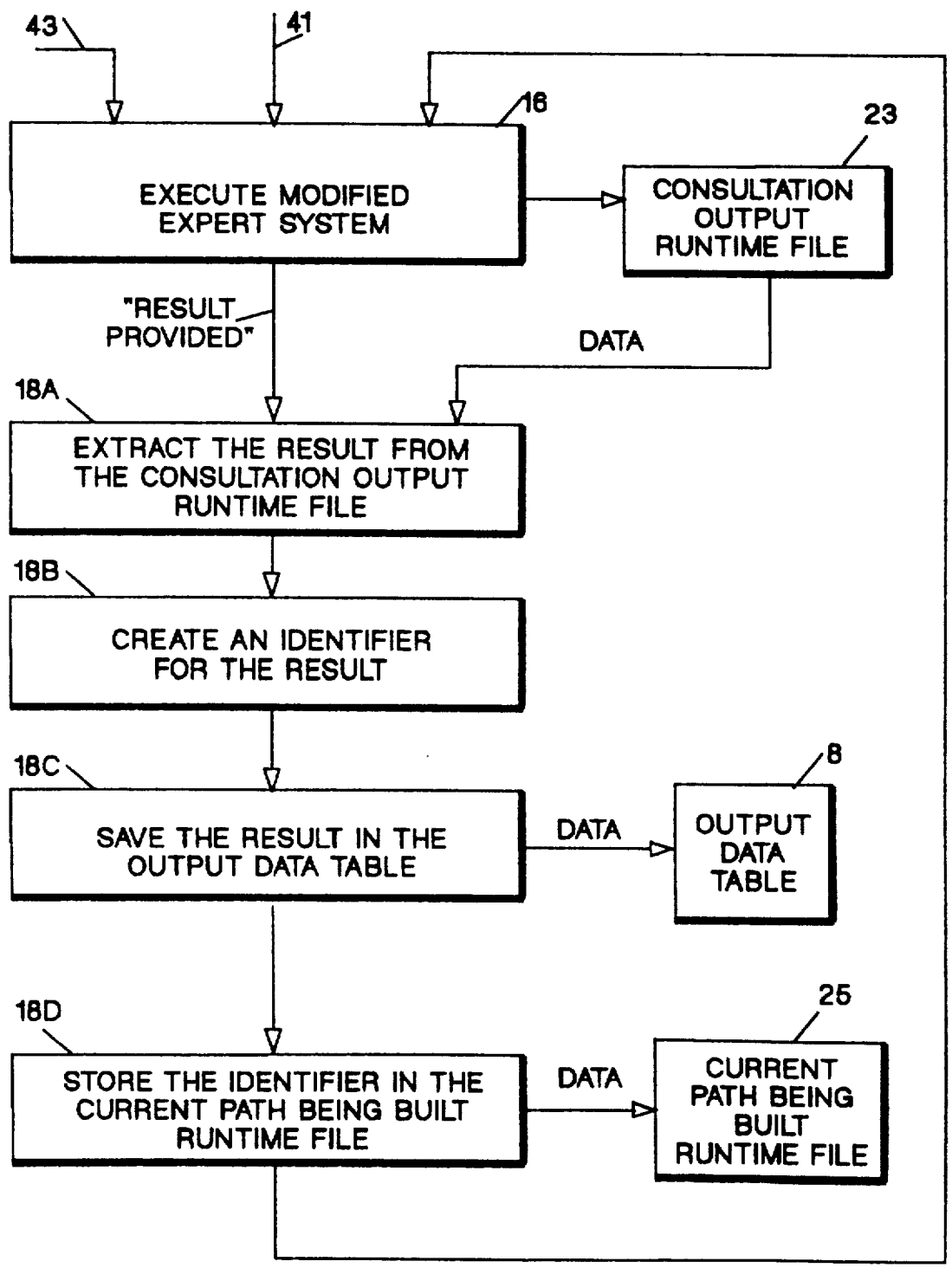
FIG. 7 schematically illustrates details of another portion of the transformation process from FIG. 5.
Figure 8:
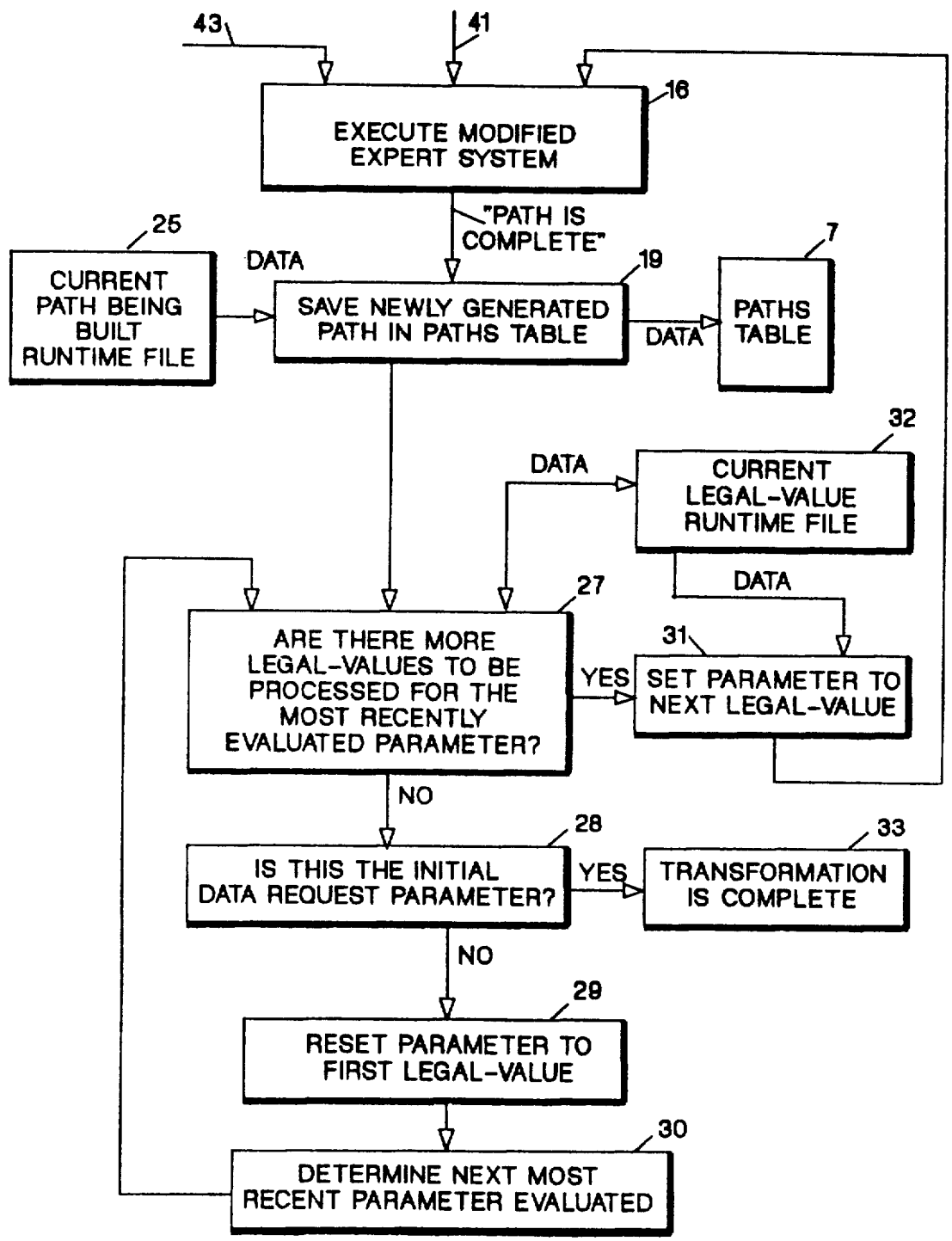
FIG. 8 schematically illustrates further details of the transformation process from FIG. 5.

The operation and logical flow of the overall transformation process is shown in FIG. 5. FIGS. 6, 7 and 8 provide more detail of the functional programs involved in the transformation process and will be discussed in later subsections. The various Run Time Files that were described earlier are used for intermediate storage by and for communication among the programs of transformation process working with the modified expert system in FIG. 2B. The programs of the transformation process operate and proceed as follows:

First, these programs initialize each parameter to point to the first legal value to be encountered in that parameter's list of legal values. The list is contained in the run time file called "Current Legal Values". The program next executes a consultation with the modified expert system as shown in FIG. 3. An example is as follows:

Refer to the previous example of "direction" used in an example for the modification process above. Note that "south" is the second legal value associated with this parameter. We will assume for the sake of this example that "direction" happens to be the fifth parameter contained in some knowledge base and that "south" happens to be the current legal value. Given these assumptions, whenever a data request for a parameter evaluation is made, the legal value currently pointed to for that parameter will be used. It will be stored in the run time file named "Current Legal Value" and will be recorded as "2". The value for the parameter "direction" is 5.

Next, as a consultation is begun, it is necessary to determine the m.n representation for each data request parameter encountered in the consultation path. Here, m.n will be 5.2. Store these data next in the run time file named "Current Path Being Built".

Next, for purposes of this example, refer to the rule entity used as an example in the section above entitled "Change all Receivers of Advice and other Information". Assume that the quoted sentence following the command word "Show" happens to be the eighth output that has occurred during the transformation. Given this assumption, whenever any output or result is produced for presentation to the client at this stage, the following will happen. First, the value for later *r representation will be assigned and sent to the output and stored in the "Current Path Being Built" run time file as, in this example, "*8". Next, the system must capture the output, associate the *r value with it and save it in the "Output Data Table" 8. The quoted sentence shown in the noted example following the command word "PROCESS" will be the output; the "*8" is associated with it and stored in the Output Data Table. The program saves the path which is the record of requests, results and values that has been created in the "Paths Table" 7 when the path has been completed. In this example, that stored Paths Table representation will be ... 5.2 *8.

The program will then determine if there are any more paths to be processed. If there are more paths to be processed, the program will adjust the contents of the "Current Legal Value" run time file as described below under the heading of "The Operation of the Path Complete Program" and will return to the step above which executes another consultation with the modified expert system. If there are no further paths to process, then the transformation process is complete.

As is evident from the foregoing description, the transformation process has to deal with three events that occur as a result of consulting the modified expert system. These are, respectively, a "data request", a "result provided" and a "completed path" event.

Each of these events is handled with a program in the transformation process itself, but the manner of implementing these functions is not rigid. In our implementation, the transformation process required the use of data files to store information that is not part of or in the form of the transformed knowledge tables. These temporary run time files were referred to because they are only needed during the transformation process and are used to pass information among its program functions. These are the files that replace the human interaction vis-a-vis the expert system and avoid the tedious and error-prone human interaction that would otherwise be required to perform a transformation process of this type.

Next, the operation of the data request program will be described in some detail. It will be noted that the foregoing description is an overall description of what the transformation program processes do in the functional sense. What we will now describe is the detailed functioning of the "data request" program 9 in FIG. 3 to be followed by the "path is complete" program 10 and then the "result provided" program 11 from FIG. 3 as well.

FIG. 5 showed the overall transformation process in its generic sense. For the operation of the data request program 9 in FIG. 3, we will now turn to a more complete description thereof as given in FIG. 6.

FIG. 6 represents an expansion schematically of the data request portion shown in FIG. 5, blocks 16 and 17. When the "data request" exit is taken to block 17 in FIG. 5 from the modified expert system, the "data request program" 9 from FIG. 3 provides the following functions:

First, the program 9 accesses the named requested parameters stored by the modified expert system in the run time file named "Consultation Output". This is shown in block 23 of FIG. 6. This run time file 23 contains the output that the modified expert system produced during a consultation and will need to be made available to the programs of the transformation process.

Next, program 9 determines the number code that is associated with the parameter named. That is, it determines the m value discussed earlier which was, for our example, 5 for the "direction". Each external source parameter had an identification number, an integer, associated with it by the modification process as described above. That parameter number code integer information is found in the "Input Data" run time file created during the modification process. This is the Input Data run time file 41 as shown in FIG. 6. Note that the run time files 24, 23, 25, 41, 32 are all included in box 6 in FIG. 4, although they are not specifically numbered therein.

Next, program 9 determines the legal value number code currently associated with the given parameter. That is, the n value as discussed earlier. The legal values for each parameter are assigned integer codes in ascending sequence. The legal value number code integer information is found in the "Current Legal Value" run time file (this file is not shown in the figure). For our example, this value is "2".

Next, program 9 identifies the legal value response that is associated with the legal value number code. This data is found in the "Input Data" run time file, 41 in FIG. 6.

Next, program 9 stores the legal value of the response in the "Consultation Input" run time file 24 in FIG. 6. This run time file contains any information that any program of the transformation process makes available to the modified expert system.

Next, the program 9 stores the parameter number code and legal value number as a pair m.n in the run time file named "Current Path Being Built" shown as block 25 in FIG. 6.

Finally, the program returns control to the modified expert system in block 16 in FIG. 6 to continue the consultation.

The Result Provided program 11 from FIG. 3 will be described next. The operation of this portion of the program is detailed in FIG. 7 which also represents an expansion of the result provided portion of FIG. 5, blocks 16 and 18. When the "Result Provided" exit is taken in the modified expert system, this program 11 performs as follows:

First, at block 18 it retrieves the output from the "Consultation Output" run time file 23 that was produced by the modified expert system. Next, it creates an identifier at block 18B for the result. This identifier is an integer number that is unique to every result. Next, the program saves the result at block 18C together with its identifier in the Output Data Table 8. Next, it stores the identifier in block 18D for the "Current Path Being Built" run time file in block 25. Finally, this program returns control to the modified expert system in block 16.

Next, the operation of the Path is Complete program 10 from FIG. 3 will be described. The operation and logic flow of this program is shown in greater detail in FIG. 8. This represents an expansion from FIG. 5, blocks 19, through 33 of FIG. 8. When the "Path is Complete" exit is taken from the modified expert system in FIG. 5, block 16, the Path is Complete program 10 performs as follows:

First, this program adds, in block 19 of FIG. 8, the end of path indicator and saves the completed path which is stored in the "Current Path Being Built" run time file in the Paths Table 7.

Second, the program determines in block 27 whether the most recent parameter evaluated has another legal value to be processed. This information is found by comparing the entry for the parameter in the "Current Legal Value" file 32 with the number of legal responses for the parameter in the "Input Data" run time file 41.

If there is another legal value for the parameter to be processed, then control returns to the modified expert system after pointing to this parameter's next legal value in block 31 and then passing control to block 16, FIG. 8. If there are no other legal values to be processed, the control continues with step 3 with the "No" exit to block 28 in FIG. 8.

The program then determines whether the entire implicit logic tree of the modified expert system has been completed. This is accomplished by checking whether the most recent parameter evaluated is the initial data request parameter in block 28. If this is the initial data request parameter, the transformation is complete. If it is not, then control continues via block 29 in FIG. 8.

In block 29, the program sets the most recent parameter evaluated indicator to point to the first legal value encountered in the list of legal values associated with that parameter. This is accomplished by setting the parameter's legal value code to 1 in the "Current Legal Value" run time file. Next, the program identifies in block 30 the next most recent parameter evaluated in the path just completed as being the "most recent" parameter evaluated and returns to block 27 to repeat the second step in this process as given above. This process repeats during subsequent consultations until the transformation is finally completes and proceeds to block 33 as shown in FIG. 8.

An illustrative example of the overall transformation program process from FIG. 5 and including the operation of the programs depicted in FIGS. 6, 7 and 8 will now be given. Consider, for example, a three parameter knowledge base, having no initial or intermediate results with the following assumptions: parameter A has one legal value; parameter B has two legal values and parameter C has three legal values. Each parameter is initialized to point to its first legal value. The m.n representation would be: A.1, B.1, C.1, and if the parameters are 1, 2, 3, then this representation is: 1.1, 2.1, 3.1. See block 15 of FIG. 5 for an indication of where this is done in the process.

At block 16 in FIG. 5, a consultation is begun. The consultation requires a value for parameter A. This is a data request. At block 17 the response A.1 is determined. It is temporarily stored, as shown in FIG. 6, in the "Current Path Being Built" run time file 25. Control returns to block 16 and another data request for parameter B occurs. Its value B.1 is stored, that is, appended to the "Current Path Being Built" run time file and the loop repeats for parameter C giving the value for C.1. The flow, with data paths to the run time files, is expanded on in FIG. 6.

The modified expert system now presents a result and the "Result Provided" exit is taken to block 18 in FIG. 5. The result is captured in the "Output Data Table" 8 as result 1. The "Current Path Being Built" run time file 25 has the result *1 appended to the path indication. The result provided flow is shown in more detail in FIG. 7.

Control will return to block 16 in FIG. 5 where the complete path is recognized and the associated exit is taken to block 19. This part of the process is expanded on in FIG. 8 where it may be seen that the path is actually saved in the "Paths Table" 7.

The setup for the next consultation flow continues at block 27 in FIG. 8. Parameter C is the most recently evaluated parameter for this assumed example. It has two more legal values to be processed (the second and third values, respectively). The "yes" exit is taken to block 31 and 2 is set as the current legal value for parameter C. Control returns to block 16 and the next consultation is begun. FIGS. 5 an 6 again show the flow of the consultation: A.1, B.1 and C.2 become the determined facts followed by saving the result as shown in FIG. 7 and then when the path is complete, in FIG. 8. Parameter C still needs to have its third legal value 3 processed. This is set as its current value at block 31 in FIG. 8. Another consultation is processed for parameter legal value pairs A.1, B.1 and C.3 producing a third result.

At block 27 in FIG. 8 it is recognized that parameter C (still the most recently evaluated parameter) has no more unprocessed legal values. Therefore, the "no" exit is taken from block 27. Parameter C is not the first parameter (A is) so the process continues: at blocks 29, where parameter C's current legal value is reset to its first legal value; to block 30, where parameter B is recognized as the next most recently evaluated parameter; and lastly, to block 27, where B is recognized as having another unprocessed legal value for fact B.2). Flow continues at block 31 where the next legal value for B is set as its current legal value.

The process will continue until three more consultations have been generated for parameter sequences A.1, B.2 and ending with C.1, C.2, C.3.

Figure 9:
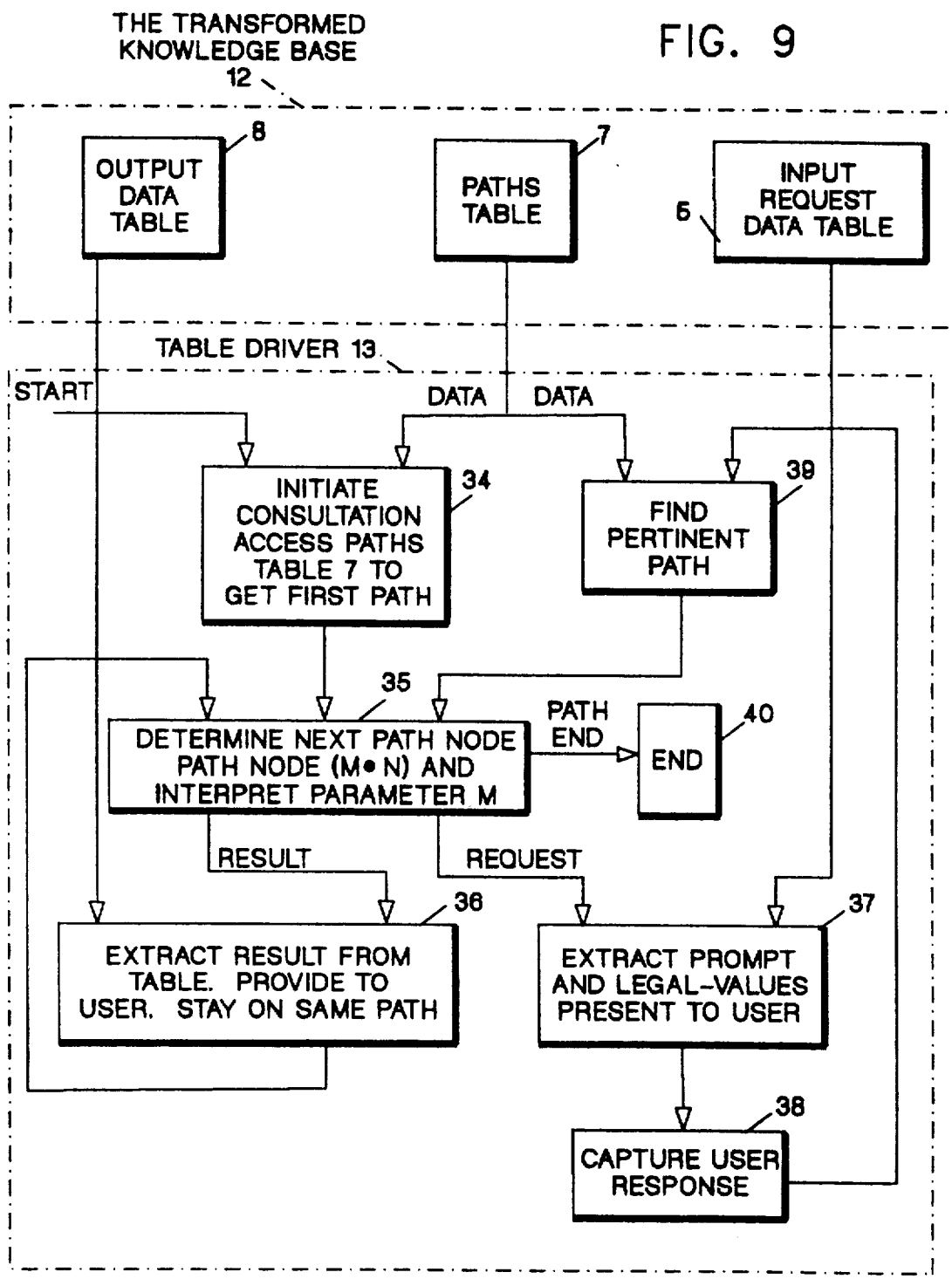
FIG. 9 illustrates schematically an equivalent expert system according to a preferred embodiment of the invention utilizing the transformed knowledge base together with a table driver program which is schematically shown also. The table driver program runs on the user's system.

The results of the completed transformation process are a series of tables namely the Input Data Request Table 5, the Paths Table 7 and the Output Data Table 8. Taken together, these represent the transformed knowledge base as shown within block 12 in FIG. 9 and schematically indicated as block 12 alone as the transformed knowledge base in FIG. 1B for an equivalent expert system. FIGS. 9 and 1B thus show alternative representations for an equivalent expert system with FIG. 9 showing greater detail for the table driver access means portion which allows access to the transformed knowledge base 12.

As noted, when the transformation process on the original expert system knowledge base has been completed, the knowledge will be in the form of the tables 5, 7 and 8 shown in FIG. 9. The knowledge in these tables can be referenced as appropriate for conducting a consultation equivalent. The tables can be transferred to any computer system or any number of systems that has a simple table driver access program that can read the tables and use the information contained therein for deciding which data or action is required next. Such a small computer system may be named a "target system" or user system. It will have neither the original expert system shell nor the knowledge base. It will use only the tabulated information from the tables 5, 7 and 8 to produce the same consultation result as would have been generated with the original expert system. The tables obviously may be contained in a diskette or other similar media.

We have transferred tables in this manner to a personal computer along with a PC table driver program for reading and executing the logic contained within the tables. We have also used an invocation command file to start the consultation of our table driver program and a commercially available dialog manager program (EZVU) together with a number of panel libraries and profiles (only one panel library and profile are needed). The panel library enables consultations to be presented in different formats depending upon the desires of the user. The profile provides specified field colors and other field characteristics and attributes such as scrollability for an output display. All of these functions are well known to those of skill in the art and do not represent a part of the invention herein and thus will not be described further. However, a diskette having these portions of programming material on it contains a readily portable "expert" that can execute pertinent consultations utilizing the currently available expertise in the knowledge domain that was represented in the original expert system knowledge base.

The media itself does not need to be as physically portable as a diskette. The same degree of usefulness could be obtained with tables residing in a host system to be accessed via telecommunications from a terminal. The media used is totally independent of the resulting "Equivalent Expert". The specific medium is dictated by the target computer system environment where it will be used. In our example, this requires a table driver program that can run on a PC and access the media to gain entry to the tables and logic contained therein. A description of our table driver program will now be given.

Table Driver on a PC

The function of the table driver or access program means is to operate on the transformed knowledge base when it resides in a target system such as the PC to produce the same consultation result that would occur on an original expert system. Our table driven "virtual expert system" will be consulted by a human client who needs access to the domain expertise contained in the tables. Our user will no longer need to wait for a human expert to become available. Neither does the human client require access to the large processing resources that would perform the inferencing and logic distilled into our tables. Thus, our table driven "virtual expert system" is an equivalent expert system and is represented schematically in FIG. 1B and so identified. It could also be consulted by a program call from another program, i.e., a non-human client.

Using FIG. 9 as a reference to assist in understanding the table driver program, the functions included are as follows:

First, the table driver initiates the consultation at block 34 and accesses the first path stored in the Paths Table 7. Second, the program determines at block 35 which entry from the Paths Table 7 is to be used. This will be determined by the answers, if any, given to any previous requests for parameter values.

Second, the program will interpret the meaning of this Paths Table 7 entry either as a data request, a result to be provided, or the end of the path in accordance with what form or data delimiter is stored in the Paths Table 7. Next, if the entry is interpreted as a data request, the program will proceed to block 37, extract parameter information from the Input Request Data Table 5, and will present the data request (which is the prompting part of a parameter also referred to as the "question") along with the legal values permitted therefor, to a user. The user's response will be captured at block 38 and used to re-enter the Paths Table 7 to find the pertinent path correlated to the user's given answer for continuing the consultation. By correlated, we mean in a manner consistent with and identical to the consultation sequence to this point. Next, the program will return control to block 35 where it will be determined what the next node on the pertinent path is. It then uses that node as in the second step in this process above.

When it is determined in block 35 that the node is a data request, the flow proceeds to block 37. The Table Driver program then:

1. Accesses the Input Request Data Table 5, extracting the parameter information.
2. Presents the data request (the prompt part of the parameter; also, referred to as the question, along with the legal values) to the user.
3. The user's response is captured (block 38).
4. The user's response is used to re-enter the Paths Table 7 to find a path pertinent to continuing the user's consultation, that is, consistent with (identical to) the consultation sequence to this point. The Table Driver program does this at block 39. The specific example in the next section will clarify this.
5. Control returns to block 35 where it determines the next node on that pertinent path and uses it as in the second step of the discussion of FIG. 9.

When the determination in block 35 is that the node represents a result, the 'result' exit is taken from block 35 and processing proceeds to block 36 where the Table Driver program then:

1. Uses the information from the Paths Table 7 to access the proper result from the Output Data Table 8.
2. Presents this result to the user.
3. Accesses the next node on the same path.
4. Returns to block 35 where it interprets the node just accessed and proceeds according to that interpretation (the second step after the discussion of FIG. 9 began).

When the end of the consultation is recognized at block 35 by means of an end of record indicator for the path in the Paths Table 7, the 'path end' exit is taken from block 35 and the consultation ends.

Interpretations of the Paths Table 7

Figure 10:
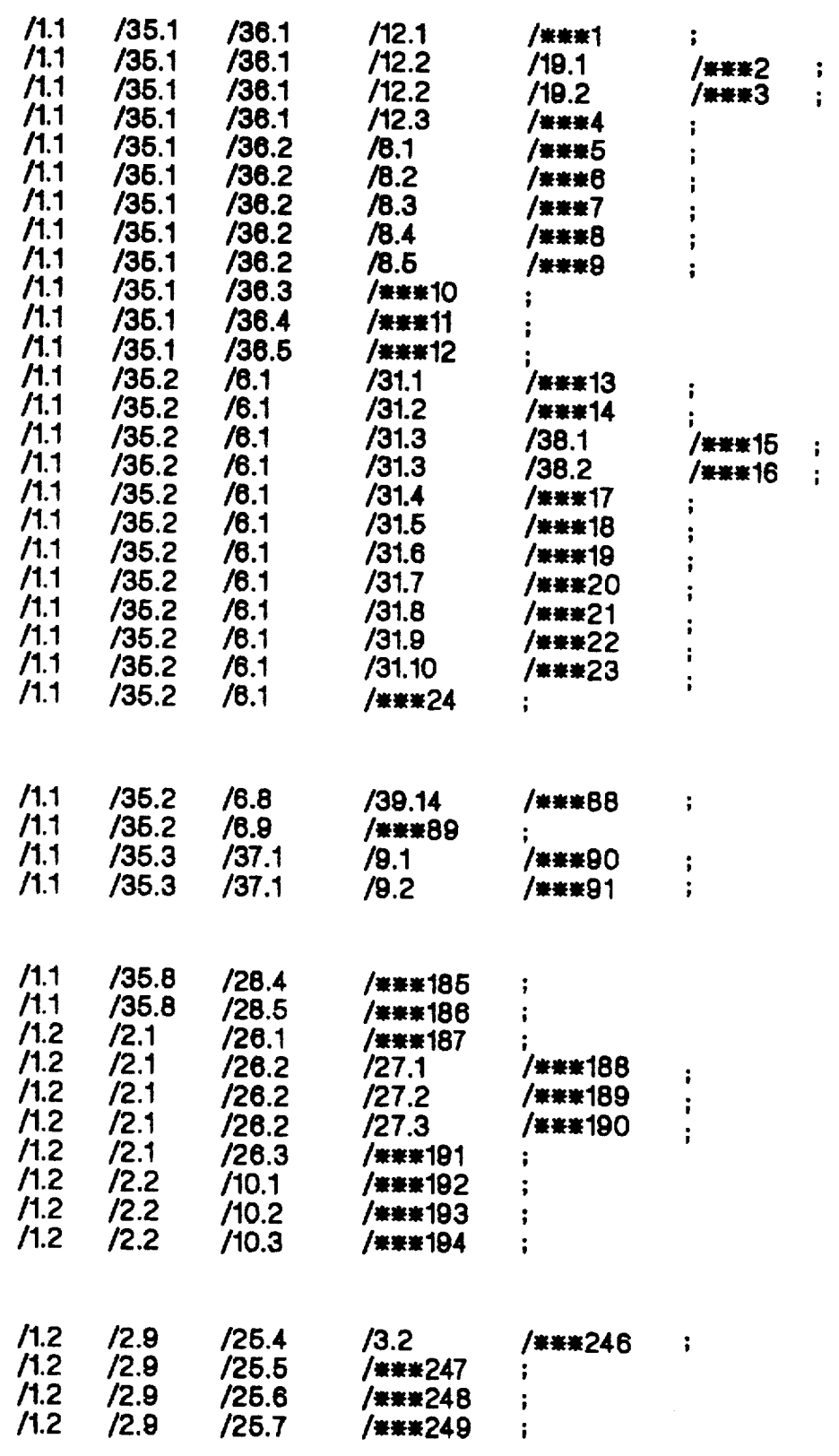

Refer to FIG. 10. Table 7 contains the consultation paths generated during the transformation process described earlier. In the figure:

Each horizontal row represents a path.

The nodes in the path are delimited using a slash ('/').

A result is identified when the node's first character is an *. Any node may be flagged with an asterisk to indicate a result (or an output), including the first node. In the case when the first node indicates a result, it is due to an introduction the expert needs to make regarding the consultations, knowledge domain, or his particular expertise.

The end of the path is identified with a ';'.

The most populous nodes in the figure are m.n pair nodes generated during the transformation process described earlier. These nodes represent a question and the associated legal value response; that is, a fact valid for this consultation.

When a consultation is started on the target system, the Table Driver program accesses the Paths Table 7, extracts the first node, interprets it, and acts according to the requirements of the node. The first node in the Paths Table 7 shown (FIG. 10) is interpreted to be a m.n pair and the Table Driver will use the m part to determine that parameter 1 should be extracted from the Input Request Data Table 5 and presented to the client. These actions would be done in blocks 35 and 37 of FIG. 9.

The client's response is recognized at block 38. If the response is the first legal value, then this path is still consistent with the consultation (recognized in block 39) and the Table Driver will read the next node in this path. When this occurs, the node is recognized as another m.n pair (at block 35). In this example as illustrated, a data request of the client needs to be made using parameter 35. The Input Request Data Table 5 is used to get this parameter along with its legal values, which are next presented to the client (at block 37 again). A response selection of the first legal value (recognized at block 38) maintains the consistency of this path (recognized at block 39), and the Table Driver continues at block 35 to get the next node - 36.1. The m part is 36 and this parameter is located and presented to the client as the Table Driver processing loop continues.

Assume now that the client selects legal value 2 for the response. The Table Driver recognizes that the path it is on is no longer consistent with the consultation in progress. It moves through the Paths Table 7 to a path that is consistent. Such a path must have nodes exactly like the processing to this point:

| /1.1 | /35.1 | /36.2 |
|---|---|---|

The first such path is the fifth path in the table in FIG. 10. The Table Driver proceeds with the next node on that path - 8.1. Parameter 8 is located in the Input Request Data Table 5 and is presented to the client along with its legal values for the client's selection. If the client selects the fifth legal value, the Table Driver will find the path that is consistent with the consultation (in this case, the ninth path) and continues using it. The next node on that path is extracted: '*9', and is recognized as a result in block 35. The Table Driver will now continue at block 36 and access the Output Data Table 8 and extract result 9, presenting this result to the client.

Since no response will be accepted from the client following an output, the Table Driver reads the next node on the same path. In this case, it is the end of path indicator showing that the consultation has ended.

The Table Driver will ask the client if another consultation is desired.

Recognize that the transformation process has created an explicit logic tree which the Paths Table 7 itself represents. After each user response, the expert system proceeded with some information or a question or both. The Original Expert System responded similarly, creating a path along an implicit logic tree to a conclusion. The transformed knowledge base Path Table 7 is the embodiment of that logic tree in explicit form. This logic tree may or may not have existed before, and may or may not exist for a human expert consultation. The human expert would recognize the usefulness (and limitations) of the tree in the same light as he would recognize the usefulness (and limits) of th Original Expert System.

Numerous table driver programs could be built to perform these general processes as will be easily understood by those of skill in the art. The table driver program process is a very straightforward table lookup routine since the Paths Table 7 will carry the process through all of its logical branches and nodes in response to actual responses as received from the human user. It will either branch to new paths or will terminate with a result in just the same fashion that the original system would have done.

Having therefore described our invention with reference to a preferred embodiment thereof, what is desired to be protected by Letters Patent and what is set forth in the claims which are appended is intended by way of description and not by way of limitation.

What is claimed is:

1. A method of providing expert system response to user inquiries comprising steps on a computer system of:
   accessing a recorded data base containing al original expert system user inquiries and user and system responses in their order of occurrence for all logically valid user inquiries, said recorded data base being generated on said original expert system using the said original expert system's logic and inferencing shell; and presenting in response to new user inquiries, when said new user inquiries correspond to any of said recorded inquiries, said recorded original expert system responses corresponding to said inquiries in their original sequence of occurrence.

2. The method of claim 1, further comprising a first step at an original existing expert system of:
   transforming an original expert system's knowledge base into a transformed knowledge base by sequentially consulting said original expert system through all logically possible user inquiry and user response sequences and recording said inquiries and user responses and the original expert system's consultation responses thereto in their order of occurrence.

3. A method as described in claim 2 for modifying an original expert system's knowledge base records on a computer system, when records contain indicators defining the external sources from which expert system-requested input will be required and when said records also contain indicators defining the receivers for said expert system's output responses, further comprising steps of:
   electronically reading said knowledge base records to discover said recorded indicators therein; and
   recording in said knowledge base records new indicators for each said indicator discovered, said new indicators controlling said transforming step to access, for any defined external source of expert system-requested input, an internal process in said computer system and controlling said transforming step to provide any expert system output responses to another internal process in said computer system as the receiver of any said expert system output responses.

4. An expert knowledge delivery system having a system logic and inference shell and means for providing output information in response to a user's inputs and inquiries for information regarding a subject for which said expert knowledge delivery system contains electronically recorded and electronically readable knowledge, said delivery system comprising:
   an electronically recorded and electronically readable knowledge base, said knowledge base containing a sequentially arranged electronic record of all logically possible valid user inquiries, inputs and the original expert system's responses thereto, said recorded user inquiries, inputs and original expert system's responses being recorded and arranged in said knowledge base in the sequence generated by exercising said original expert system's logic and
   electronic access and presentation means for accessing said electronic knowledge base and presenting, as expert knowledge delivery system information output to a user, portions of said recorded responses.

* * * * *

UNITED STATES PATENT AND TRADEMARK OFFICE
CERTIFICATE OF CORRECTION

PATENT NO. : 5,274,801
DATED : December 28, 1993
INVENTOR(S) : O. Michael Gordon, John R. Hubbell, Norman J. Woodland It is certified that error appears in the above-identified patent and that said Letters Patent is hereby corrected as shown below:

Title Page: item [54]

Title, Line 1, change "ARTIFICAL" to

-- ARTIFICIAL --.

Column 1, Line 2, change "ARTIFICAL" to

-- ARTIFICIAL --.

Signed and Sealed this

Seventeenth Day of May, 1994

Attest:

BRUCE LEHMAN

*Attesting Officer*      *Commissioner of Patents and Trademarks*